(12) United States Patent
Lane et al.

(10) Patent No.: US 12,264,088 B2
(45) Date of Patent: *Apr. 1, 2025

(54) WATER-SAVINGS ADIABATIC SPRAY SYSTEM

(71) Applicant: Evapco, Inc., Taneytown, MD (US)

(72) Inventors: John W. Lane, Finksburg, MD (US); Davey J. Vadder, Manchester, MD (US)

(73) Assignee: Evapco, Inc., Taneytown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,735

(22) Filed: Jun. 20, 2023

(65) Prior Publication Data

US 2024/0018022 A1    Jan. 18, 2024

Related U.S. Application Data

(60) Continuation of application No. 17/013,030, filed on Sep. 4, 2020, now Pat. No. 11,679,997, which is a division of application No. 15/608,319, filed on May 30, 2017, now Pat. No. 10,766,792.

(60) Provisional application No. 62/342,717, filed on May 27, 2016.

(51) Int. Cl.
 *C02F 1/44* (2023.01)
 *B67D 7/80* (2010.01)
 *C02F 5/08* (2023.01)
 *C02F 9/00* (2023.01)
 *C02F 1/32* (2023.01)
 *C02F 1/42* (2023.01)
 *C02F 1/58* (2023.01)
 *C02F 1/66* (2023.01)
 *C02F 103/02* (2006.01)

(52) U.S. Cl.
 CPC ............ *C02F 1/441* (2013.01); *B67D 7/80* (2013.01); *C02F 5/083* (2013.01); *C02F 9/00* (2013.01); *C02F 1/32* (2013.01); *C02F 1/42* (2013.01); *C02F 1/58* (2013.01); *C02F 1/66* (2013.01); *C02F 5/086* (2013.01); *C02F 2103/023* (2013.01)

(58) Field of Classification Search
 CPC ..... B67D 7/80; C02F 1/32; C02F 1/42; C02F 1/441; C02F 1/58; C02F 1/66; C02F 2103/023; C02F 5/083; C02F 5/086; C02F 9/00
 See application file for complete search history.

*Primary Examiner* — Dirk R Bass
(74) *Attorney, Agent, or Firm* — Whiteford, Taylor & Preston, LLP; Peter J. Davis

(57) ABSTRACT

A water savings system and method for reducing the amount of water needed for adiabatic cooling including the use of a softener and a reverse osmosis device, in which tap water, softened if necessary, is delivered to a reverse osmosis device and softened water alone, reverse osmosis reject water, or softened water combined with reverse osmosis reject water is delivered to spray nozzles for cooling, and reverse osmosis pure water is stored and used periodically to flush the coils to inhibit and/or prevent corrosion from dissolved salts and other solids in the spray water.

4 Claims, 3 Drawing Sheets

WATER-SAVINGS ADIABATIC SPRAY SYSTEM

FIELD OF THE INVENTION

This invention air-cooled fluid coolers and condensers.

DESCRIPTION OF THE BACKGROUND

Air-cooled heat exchangers such as fluid coolers and condensers reject heat to the atmosphere. These devices reject heat by sensible heating of the ambient air; therefore the lowest temperature they can achieve is some temperature above the ambient dry bulb temperature. By use of adiabatic cooling, the ambient air can be cooled to a temperature approaching the wet bulb temperature. This pre-cooled air is then used to reject heat. By use of adiabatic cooling, a dry-cooling heat exchanger can be made smaller (less expensive) or can cool to a lower temperature (more energy efficient) or some combination of the two.

There are two typical ways that adiabatic cooling is performed. One way is to cool the air with saturated pads. Thick pads are placed at the inlet to the air-cooled heat exchanger. These pads are saturated with water. When incoming air is drawn across these pads, some of the water is evaporated and the air is cooled. Although these pads are in widespread use, they have several drawbacks. To full saturate the pads, a heavy stream of water needs to be run over the pads. Most of this water is not evaporated and is either sent to drain or recirculated. Sending this water to drain is very inefficient, while recirculation requires another system to treat and periodically drain the water. Additionally, these pads are made of a material that absorbs water and they have a life expectancy of only a few years before needing to be replaced. Furthermore, the pads are left in place year round, even when adiabatic cooling is not used. The pads cause a resistance to air flow and require higher fan horsepower all year round.

The second typical way to generate adiabatic cooling is by the use of misting nozzles. Misting nozzles generate small droplets of water that quickly evaporate thus cooling the air. Misting nozzles spray water at a lower rate than water is streamed over the saturated pads, thus there is no need for a recirculation system and less water is used. The nozzles do not cause any resistance to air flow, so fan horsepower is kept at a minimum. One issue with misting nozzles is that the minerals that are contained in the spray must pass through the coils and these minerals can cause issues. In a pad system these minerals stay with the excess water that is sent over the pads or is trapped on the pads themselves.

To prevent scaling, particularly of calcium carbonate, soft water or softened water must be used with misting nozzles. If hard water is sprayed, scale can form at the nozzles and on the coils. To minimize this problem many manufacturers severely limit the number of hours that the adiabatic sprays can be run each year. Scaling can be avoided by using softened water. Softening replaces the +2 valance cations in the water with sodium. Sodium salts are highly soluble and thus will not form a scale. The concern with softened water is that all of the anions that were present in the hard water are still present in the softened waters. These anions, particularly chloride, sulfate, and hydroxide, can be very corrosive to the coils and fins. This is particularly true if the salts are allowed to stay on the coils for extended period of time. To minimize these corrosion effects many manufacturers limit the number of hours that the adiabatic sprays can be run each year with softened water.

The solution for running extended hours with an adiabatic spray system is to use very low mineral water. Typically reverse osmosis ("RO") water is used for these extended-hour systems. Low-cost RO systems are available that can provide sufficient RO water to operate a cell at a reasonable cost. These low-cost units operate off of domestic water pressure without the need of a separate high-pressure pump. These RO devices should be fed softened water for best membrane life. The RO will remove most of the sodium ions as well as most of the corrosive anions. The resulting water is often less corrosive than rainwater to the materials of construction of the heat exchanger.

There are issues with using these low-cost RO systems for adiabatic cooling. One is that these systems are inefficient on water use. The table below illustrates the output of a low-cost, high-volume RO. Fully 65% of the raw softened water is discarded in order to generate 35% clean water.

| Sample | Sodium | Chloride | Sulfate | Alkalinity (hydroxide) | % of Flow |
|---|---|---|---|---|---|
| Input Raw Softened Feed-Water | 120 ppm | 57 ppm | 24 ppm | 168 ppm | 100% |
| Output RO Permeate Water | 2.5 ppm | 1 ppm | >1 ppm | 5 ppm | 35% |
| Output RO Reject Water | 183 ppm | 85 ppm | 41 ppm | 247 ppm | 65% |

Another issue is that even though a single unit is not too expensive, a single unit can provide sufficient misting for only about a single cell; most units will have 4 or more cells thus requiring multiple RO units.

SUMMARY OF THE INVENTION

This invention provides a method to use softened water for adiabatic cooling without severely limiting the hours of operation each year. According to the invention, softened water may be used to provide adiabatic cooling over extended hours, with a periodic reverse osmosis "RO" flush of the coils. In another embodiment of the invention, the RO-reject stream from generating the pure water for the RO flush may be combined with softened water and used for adiabatic cooling thus using the RO-reject water for cooling instead of discarding. In another embodiment, particularly for small units, no softened water is used directly. According to this embodiment, the cooling system operates with RO-reject water for the spray, while storing the RO-purified water ("RO-permeate"). The system then switches to RO-pure with additional flow added to flush the coil while RO-reject is stored. In both of these embodiments no RO-reject is discarded.

DETAILED DESCRIPTION

Figure 1:
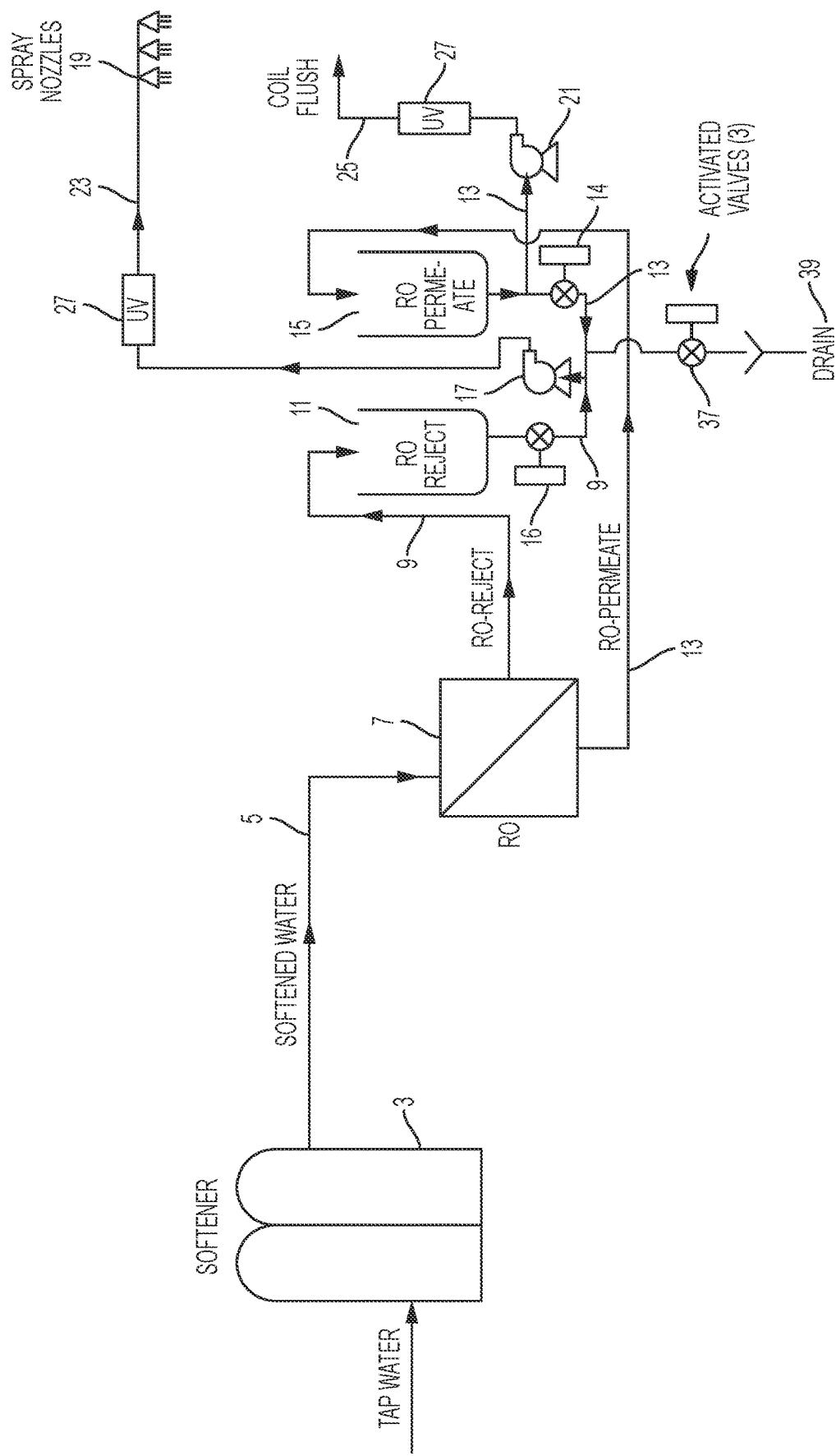
FIG. 1 is a schematic according to a first embodiment of the invention.

FIG. 1 illustrates one embodiment of the invention. In this embodiment tap water or different source water is sent to a softener 3. The softener is only necessary if the source water is moderately hard or harder. The softener operates by ion exchange to replace calcium and magnesium ions in the source water with sodium ions. The softened water 5 is then fed to a reverse osmosis device 7 ("RO"). The RO 7 shown in FIG. 1 is a standard commercially available device that operates on source-water pressure. A more complex RO system with a high pressure pump may be used, but this type of RO system is usually too expensive for an adiabatic system.

The RO reject water 9 with concentrated minerals is directed to the RO-Reject storage tank 11; the RO permeate 13 is directed to the RO-Permeate storage tank 15. A spray pump 17 is connected to receive water from either the RO-Reject storage tank 11 or the RO-Permeate storage tank 15 depending on the position of valves 14 and 16. The spray pump 17 provides flow to the misting nozzles 19 for cooling. When operating from the RO-Reject tank 11, the nozzles 19 will mist high mineral containing water but not scale-forming water since the scale forming minerals have been removed by softening. Some of the minerals may deposit on the coil and fins and if left could result in corrosion. To prevent this corrosion, pure mineral free water (RO-Permeate) 13 is periodically used to flush the coil via flush pump 21 removing any minerals that may have deposited on the fins and coils. Optionally some of this RO permeate water 13 could be sent to the nozzles for additional cooling by opening valve 14 and closing valve 16. Both the spray nozzle line 23 and the coil flush line 25 could be configured with a UV system 27 to minimize the potential for the growth of pathogenic bacteria such as Legionellae. The system also is configured to allow complete drainage when not in use to eliminate the risk of biological growth in stagnant water or freezing. In this design 100% of the water sent to the RO 7 is utilized either for cooling or flushing the coil.

The system also is configured to allow complete drainage via valves 14, 16, and 37 and drain 39 when not in use to eliminate the risk of biological growth in stagnant water or freezing.

Figure 2:
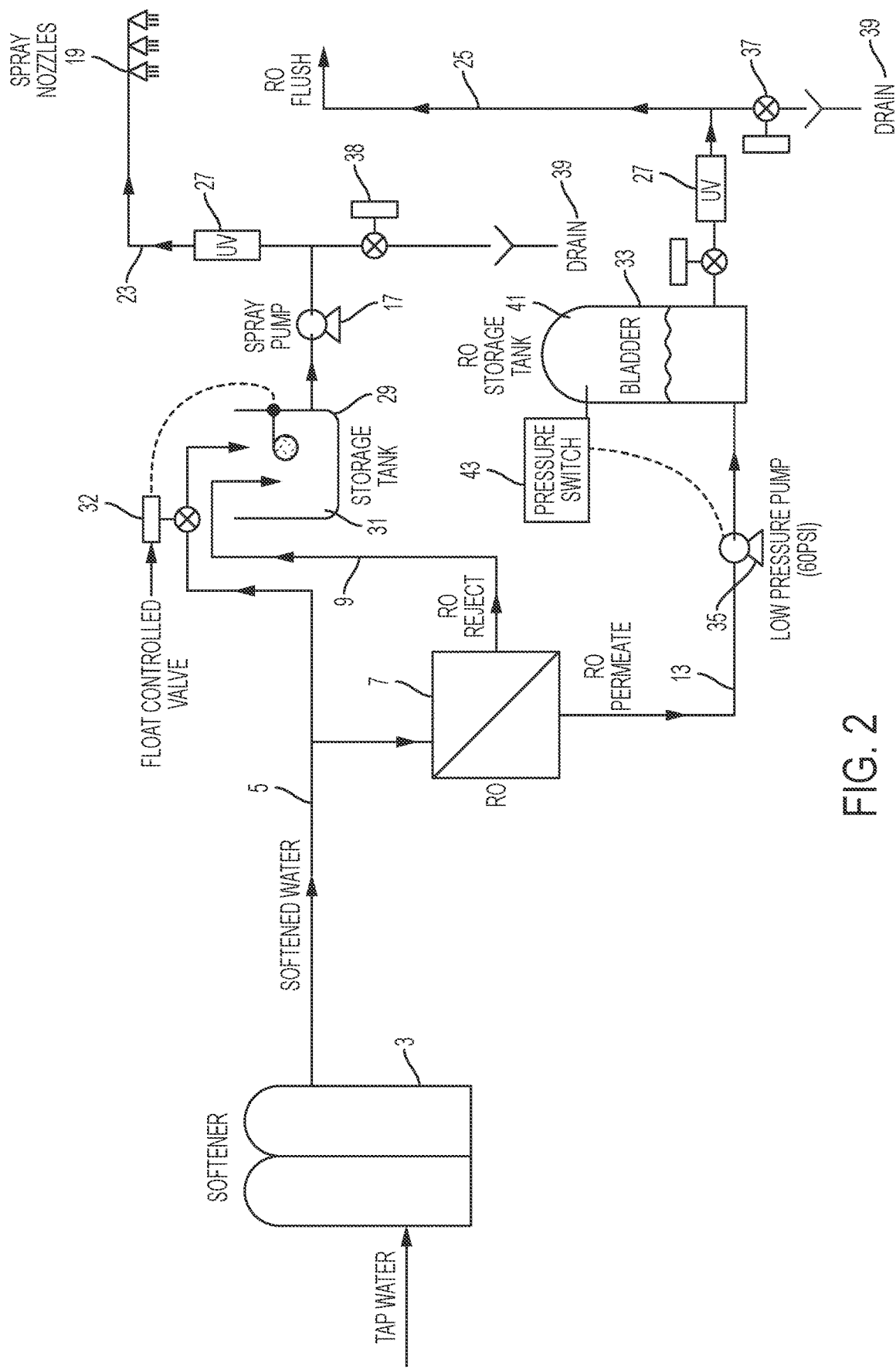
FIG. 2 is a schematic according to a second embodiment of the invention.

FIG. 2 illustrates another embodiment of the invention. In this embodiment tap water or different source water is sent to a softener 3. The softener 3 is only necessary if the source water is moderately hard or harder. The softener 3 operates by ion exchange to replace calcium and magnesium ions in the source water with sodium ions. The softened water 5 is then fed to a reverse osmosis device 7 ("RO"). The RO 7 shown in FIG. 2 is a standard commercially available device that operates on source-water pressure. A more complex RO system with a high pressure pump may be used, but this type of RO system is usually too expensive for an adiabatic system.

The RO-Reject water 9 is sent to a storage tank 29 where it combines with additional softened water 5. This combined softened/RO reject water 31 is used for cooling by sending to the spray pump 17. Since all of the water has been softened, this water will not result in scaling on the fins. When operating from the RO-Reject/softened-water tank 29, the nozzles 19 will mist high mineral containing water but not scale-forming water since the scale forming minerals have been removed by softening. Some of the minerals may deposit on the coil and fins and if left could result in corrosion. To prevent this corrosion, pure mineral free water (RO-Permeate) 13 is periodically used to flush the coil.

The RO-Permeate water 13 is sent to a pressurized storage tank 33 via low pressure pump 35. The pressure in the storage tank 33 may be maintained and/or adjusted via bladder 41, pressure switch 43 and low pressure pump 35. Because storage tank 33 is pressurized, a smaller RO unit can be used and run at night or other times that adiabatic cooling is unnecessary. Periodically this RO-permeate water 13 is used to flush the coils removing any minerals that may have deposited on the fins and coils.

Both the spray nozzle line 23 and the coil flush line 25 may be configured with a UV system 27 to minimize the potential for the growth of pathogenic bacteria such as *Legionella*. The system also is configured to allow complete drainage via valves 37 and 38 and drains 39 when not in use to eliminate the risk of biological growth in stagnant water or freezing. In this design not only is 100% of the water sent to the RO used either cooling or flushing, but fewer systems or smaller RO units are needed as the RO-permeate water 13 is used only to flush the coils.

Figure 3:
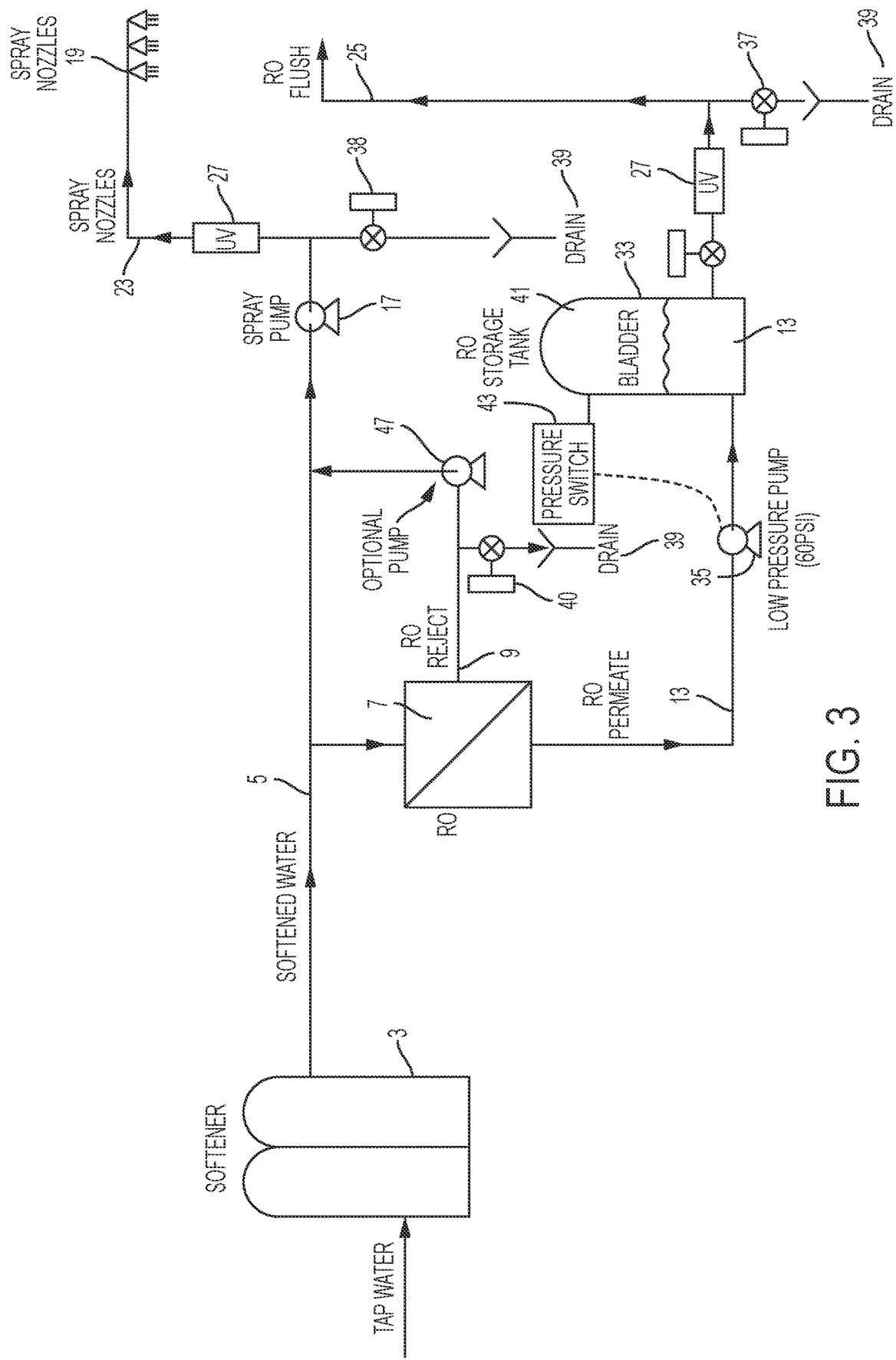
FIG. 3 is a schematic according to a third embodiment of the invention.

FIG. 3 illustrates another embodiment of the invention. This embodiment is similar to the one in FIG. 2 except that the RO-reject water 9 is sent to drain 39. By sending the RO-reject water to drain 39, the system can be greatly simplified as the RO-reject/softened-water storage tank 29 and float control valve 32 (FIG. 2) can be eliminated. The disadvantage is that the RO-reject water is discarded. Some of the reject water can be recovered if the RO is operated when the spray pump 17 is energized. By use of an auxiliary pump 47 or aspiration and additional drain valve 40, the RO-reject water 9 could be combined with the softened water 5 and used for cooling.

The fundamental problem that is corrected by this invention is the corrosion of fins and coils caused by extensive use of softened water. For cost and heat-transfer abilities aluminum and aluminum alloys are extensively used in air-cooled heat exchangers. Aluminum is very sensitive to pH both high and low (amphoteric). For corrosion protection, often the aluminum is coated which adds cost, reduces heat transfer, and is still subject to corrosion at the inevitable holidays in the coating. Aluminum is very resilient to aqueous corrosion at near neutral pH. If the water leaving the softener is not near neutral (5 to 8.5) then that water must be pH adjusted before use. Fortunately most water used for adiabatic cooling will fall within this pH guideline.

Aluminum is also subject to corrosion by salts that have dried on the surface. Most of these salts are hygroscopic and will absorb sufficient moisture from the atmosphere when the relative humidity is greater than 60%. Thus corrosion can occur even in seemingly dry conditions.

Another embodiment of this invention is a method for determining how often to flush the coil. The amount of water to be flushed on the coil is related to both the quantity of water sprayed for cooling and the amount of ions in the spray water. For example, a typical 5'×6' air-cooled cell will require approximately 40 gallons per hour (150 liters/hour) of spray for adiabatic cooling. Most of the minerals in that water will harmlessly pass through the coil but up to 1% of these minerals could accumulate on the coils. If the water contains 500 ppm of dissolved solids then 500 mg/liter×150 liters×1%=750 mg will be deposited on the coils and fins every hour of spray operation. The corrosive effect of these salts will be ameliorated by a flush of RO-permeate water. A flush of only 20 liters of RO-permeate water will dilute this surface contamination to 750 mg/20 liter=37.5 ppm. The lower this value, the less the corrosion attack will occur. A value less than 100 ppm is unlikely to be a corrosion concern. For a typical air-cooler 5'×6' about 20 liters (5 gallons) are necessary to assure that all surfaces are flushed. With this example, flushing every 2 hours and at the end of adiabatic cooling cycle would be sufficient to minimize corrosion. Thus by flushing with only 20 liters of RO-permeate water, 300 liters of softened water can be used for cooling without significant corrosion attack on the coils and fins.

The invention claimed is:

1. A water supply system for delivering adiabatic pre-cooling water to an air flow entering a heat exchanger, comprising:
   a coil flush water flow path including a water softener, a reverse osmosis device, and a reverse osmosis permeate storage tank, said coil flush water flow path having a terminus located to deliver softened reverse osmosis permeate to an outside surface of a coil of said heat exchange device; and
   a first adiabatic cooling water flow path including said water softener, an adiabatic cooling water spray pump, and adiabatic cooling water spray nozzles directed at said air flow entering said heat exchange device.

2. The water supply system according to claim 1, said coil flush water flow path including a RO permeate pump.

3. The water supply system according to claim 1, comprising a second adiabatic cooling water flow path that leaves said first adiabatic cooling water flow path, passes through said reverse osmosis device and rejoins said first adiabatic cooling water flow path with reverse osmosis reject water.

4. The water supply system according to claim 3, wherein said first adiabatic cooling water flow path and said second adiabatic cooling water flow path rejoin at a storage tank.

* * * * *